(12) United States Patent
Chiang et al.

(10) Patent No.: US 10,587,009 B2
(45) Date of Patent: Mar. 10, 2020

(54) ELECTROLYTE COMPOSITION AND METAL-ION BATTERY EMPLOYING THE SAME

(71) Applicant: Industrial Technology Research Institute, Hsinchu (TW)

(72) Inventors: Chien-Chih Chiang, New Taipei (TW); Lu-Yu Wang, Tainan (TW); Mao-Chia Huang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 101 days.

(21) Appl. No.: 15/852,878

(22) Filed: Dec. 22, 2017

(65) Prior Publication Data

US 2019/0198929 A1 Jun. 27, 2019

(51) Int. Cl.
*H01M 10/0569* (2010.01)
*H01M 4/66* (2006.01)
(Continued)

(52) U.S. Cl.
CPC ......... *H01M 10/0569* (2013.01); *H01M 2/16* (2013.01); *H01M 2/1613* (2013.01); *H01M 4/38* (2013.01); *H01M 4/48* (2013.01); *H01M 4/587* (2013.01); *H01M 4/5815* (2013.01); *H01M 4/661* (2013.01); *H01M 4/663* (2013.01); *H01M 4/747* (2013.01); *H01M 4/806* (2013.01); *H01M 10/054* (2013.01); *H01M 10/056* (2013.01); *H01M 10/0567* (2013.01); *H01M 10/0568* (2013.01); *H01M 10/4235* (2013.01);
(Continued)

(58) Field of Classification Search
None
See application file for complete search history.

(56) References Cited

U.S. PATENT DOCUMENTS

| 6,558,838 B1 | 5/2003 | Noda et al. |
| 8,518,298 B2 * | 8/2013 | Abbott ............ C25C 3/00 |
| | | 252/183.13 |

(Continued)

FOREIGN PATENT DOCUMENTS

| CN | 104078705 A | 10/2014 |
| TW | 201609257 A | 3/2016 |

OTHER PUBLICATIONS

A. Papancea, et al., "Conductivity Studies of Imidazolium-Based Ionic Liquids in Aqueous Solution", Bulletin of the Transilvania University of Brşov, vol. 8, (57), No. 1-2015, p. 67-72.
(Continued)

*Primary Examiner* — Rena Dye Cronin
(74) *Attorney, Agent, or Firm* — Birch, Stewart, Kolasch & Birch, LLP

(57) ABSTRACT

An electrolyte composition and a metal-ion battery employing the same are provided. The electrolyte composition includes a metal halide, a solvent, and an additive. The solvent is an ionic liquid or organic solvent. The molar ratio of the metal halide to the solvent is from 1:1 to 2.2:1. The amount of additive is from 1 wt % to 25 wt %, based on the total weight of the metal halide and the solvent. The additive is monochloroethane, trichlorethylene, dichloroethane, trichloroethane, phosphorus trichloride, phosphorus pentachloride, methyl pyidine, methyl nicotinate, or a combination thereof.

15 Claims, 3 Drawing Sheets

(51) Int. Cl.
*H01M 4/587* (2010.01)
*H01M 4/38* (2006.01)
*H01M 2/16* (2006.01)
*H01M 10/054* (2010.01)
*H01M 10/0568* (2010.01)
*H01M 10/0567* (2010.01)
*H01M 4/80* (2006.01)
*H01M 4/58* (2010.01)
*H01M 4/48* (2010.01)
*H01M 4/74* (2006.01)
*H01M 10/42* (2006.01)
*H01M 10/056* (2010.01)
*H01M 4/02* (2006.01)

(52) U.S. Cl.
CPC .......... *H01M 2004/028* (2013.01); *H01M 2300/0028* (2013.01); *H01M 2300/0031* (2013.01)

(56) References Cited

U.S. PATENT DOCUMENTS

| | | | | |
|---|---|---|---|---|
| 9,166,249 | B2 | 10/2015 | Darolles et al. | |
| 2009/0162736 | A1* | 6/2009 | Vallance | H01M 4/38 429/50 |
| 2013/0280603 | A1* | 10/2013 | Yoon | H01M 4/133 429/211 |
| 2014/0113202 | A1* | 4/2014 | Sun | H01M 10/052 429/328 |
| 2014/0134478 | A1* | 5/2014 | Zhao | H01M 10/36 429/199 |
| 2016/0064770 | A1 | 3/2016 | Lee et al. | |
| 2017/0182485 | A1 | 6/2017 | Uppara et al. | |
| 2018/0261848 | A1* | 9/2018 | Su | H01M 4/628 |
| 2019/0006701 | A1* | 1/2019 | Dai | H01M 4/38 |

OTHER PUBLICATIONS

E. Karpierz, et al., "Ternary mixtures of ionic liquids for better salt solubility, conductivity and cation transference number improvement", Scientific Reports, 2016, strep35587.

Oliver Zech, et al., "The Conductivity of Imidazolium-Based Ionic Liquids from (248 to 486) K.B. Variation of the Anion", J. Chem. Eng. Data, 2010, p. 1774-1778.

Telpriore G. Tucker, and C. Austen Angell, "Approaches to, and Problems with Ionic Liquid Electrolytes for Alkali Metal Electrochemical Devices: The Case of Low-Melting Chloroaluminate Binary Solutions", Journal of the Electrochemical Society, 2014, H796-H801.

Wen-Jing Li, et al., "Measurement and Correlation of the Ionic Conductivity of Ionic Liquid-Molecular Solvent Solutions", Chinese Journal of Chemistry, 2007, 25, p. 1349-1356.

Taiwanese Office Action and Search Report, dated Sep. 12, 2018, for Taiwanese Application No. 106145269.

* cited by examiner

ELECTROLYTE COMPOSITION AND METAL-ION BATTERY EMPLOYING THE SAME

TECHNICAL FIELD

The technical field relates to an electrolyte composition and a metal-ion battery employing the same.

BACKGROUND

Aluminum is the most abundant metal on earth, and electronic devices that are based on aluminum have the advantage of being inexpensive to produce. Furthermore, aluminum has low flammability and low electronic redox properties, meaning that an aluminum-ion battery might offer significant safety improvements.

However, the electrolyte composition employed in some traditional metal-ion batteries exhibits poor electrical conductivity, resulting in low capacity and short lifespan of the metal-ion battery.

Therefore, the industry needs a novel electrolyte composition to overcome the problems mentioned above.

SUMMARY

According to embodiments of the disclosure, the disclosure provides an electrolyte composition including a metal halide, a solvent and an additive. The solvent is a halogen-containing ionic liquid or an organic solvent, and the molar ratio of the metal halide to the solvent is from 1:1 to 2.2:1. The amount of additive is from 0.1-25 wt %, based on the total weight of the metal halide and the solvent. The additive is monochloroethane, trichlorethylene, dichloroethane, trichloroethane, phosphorus trichloride, phosphorus pentachloride, methyl pyidine, methyl nicotinate or a combination thereof.

According to embodiments of the disclosure, the disclosure also provides a metal-ion battery. The metal-ion battery includes a positive electrode, a separator and a negative electrode. The negative electrode and the positive electrode are separated from each other by the separator, and the aforementioned electrolyte composition is disposed between the positive electrode and the negative electrode.

A detailed description is given in the following embodiments with reference to the accompanying drawings.

DETAILED DESCRIPTION

Figure 1:
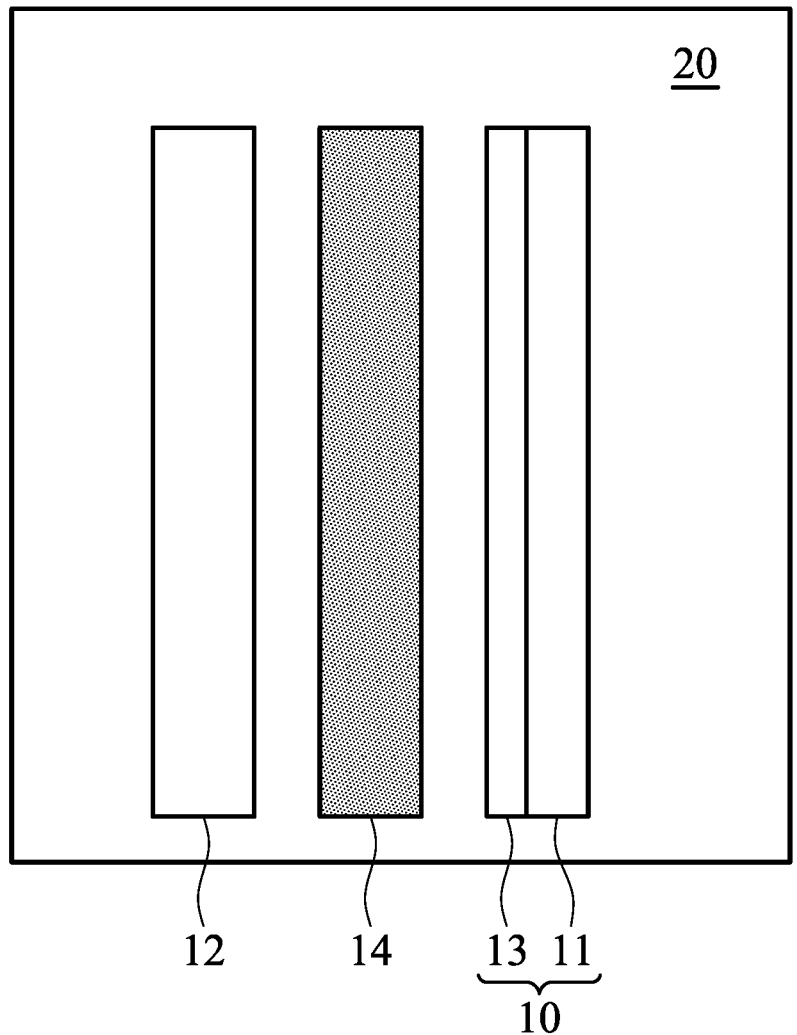
FIG. 1 a schematic view of the metal-ion battery according to an embodiment of the disclosure.

The disclosure provides an electrolyte composition and a metal-ion battery employing the same. According to embodiments of the disclosure, besides the metal halide and the solvent, the electrolyte composition includes an additive in a specific amount. Therefore, the electrical conductivity of the electrolyte composition can be improved, thereby increasing the capacity, shortening the charging time, and prolonging the lifespan of the metal-ion battery.

According to embodiments of the disclosure, the electrolyte composition can include a metal halide, a solvent and an additive. The solvent can be a halogen-containing ionic liquid or an organic solvent, and the molar ratio of the metal halide to the solvent can be from about 1:1 to 2.2:1. For example, the molar ratio of the metal halide to the solvent can be about 1.1, 1.2, 1.3, 1.4, 1.5, 1.6, 1.7, 1.8, 1.9, 2.0, 2.1 or 2.2. The additive can be monochloroethane, trichlorethylene, dichloroethane, trichloroethane, phosphorus trichloride, phosphorus pentachloride, methyl pyidine, methyl nicotinate, or a combination thereof.

According to embodiments of the disclosure, dichloroethane can be 1,1-dichloroethane or 1,2-dichloroethane, and trichloroethane can be 1,1,1-trichloroethane or 1,1,2-trichloroethane.

According to embodiments of the disclosure, the amount of additive can be 0.1-25 wt % (such as 0.5 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt % or 24 wt %), based on the total weight of the metal halide and the solvent. When the amount of additive is too low, the electrical conductivity of the electrolyte composition cannot be improved. When the amount of additive is too high, the total capacity of the metal-ion battery employing the electrolyte composition is reduced since the concentration of the active component for intercalation is reduced.

According to embodiments of the disclosure, the metal halide can be metal chloride, such as aluminum chloride, ferric chloride, zinc chloride, cupric chloride, manganese chloride, chromium chloride, or a combination thereof.

According to embodiments of the disclosure, when the solvent is halogen-containing ionic liquid, the molar ratio of the metal halide to the halogen-containing ionic liquid can be from about 1:1 to 2.2:1. For example, the molar ratio of the metal halide to the halogen-containing ionic liquid can be about 1.1, 1.2, 1.3, 1.4, 1.5, 1.6, 1.7, 1.8, 1.9, 2.0, 2.1 or 2.2.

According to embodiments of the disclosure, the halogen-containing ionic liquid can be a salt have a melting point less than 100° C. According to embodiments of the disclosure, the halogen-containing ionic liquid can be chloride-containing ionic liquid. According to embodiments of the disclosure, the halogen-containing ionic liquid can include ammonium chloride, azaannulenium chloride, azathiazolium chloride, benzimidazolium chloride, benzofuranium chloride, benzotriazolium chloride, borolium chloride, cholinium chloride, cinnolinium chloride, diazabicyclodecenium chloride, diazabicyclononenium chloride, diazabicyclo-undecenium chloride, dithiazolium chloride, furanium chloride, guanidinium chloride, imidazolium chloride, indazolium chloride, indolinium chloride, indolium chloride, morpholinium chloride, oxaborolium chloride, oxaphospholium chloride, oxazinium chloride, oxazolium chloride, iso-oxazolium chloride, oxathiazolium chloride, pentazolium chloride, phospholium chloride, phosphonium chloride, phthalazinium chloride, piperazinium chloride, piperidinium chloride, pyranium chloride, pyrazinium chloride, pyrazolium chloride, pyridazinium chloride, pyridinium chloride, pyrimidinium chloride, pyrrolidinium chloride, pyrrolium chloride, quinazolinium chloride, quinolinium chloride, iso-quinolinium chloride, quinoxalinium chloride, selenozolium chloride, sulfonium chloride, tetrazolium chloride, iso-thiadiazolium chloride, thiazinium chloride, thiazolium chloride, thiophenium chloride, thiuronium chloride, triazadecenium chloride, triazinium chloride, triazolium chloride, iso-triazolium chloride or uronium chloride.

According to some embodiments of the disclosure, the halogen-containing ionic liquid can be methylimidazolium chloride, 1-1-ethyl-3-methylimidazolium chloride, 1-butyl-3-methylimidazolium chloride, cholinium chloride, or a combination thereof.

According to embodiments of the disclosure, when the additive is 1,2-dichloroethene, the electrolyte composition employing the same is suitable for operating at high temperatures, since 1,2-dichloroethene is a solvent having a high dielectric constant and is compatible with the halogen-containing ionic liquid.

According to embodiments of the disclosure, when the solvent is an organic solvent, the molar ratio of the metal halide to the organic solvent can be from about 1:1 to 2.2:1. For example, the molar ratio of the metal halide to the organic solvent can be about 1.1, 1.2, 1.3, 1.4, 1.5, 1.6, 1.7, 1.8, 1.9, 2.0, 2.1 or 2.2. the organic solvent can be urea, N-methylurea, dimethyl sulfoxide, methylsulfonylmethane or a combination thereof.

According to embodiments of the disclosure, the electrolyte composition of the disclosure can be applied in an electroplating process or an electrolytic process. In addition, According to embodiments of the disclosure, the electrolyte composition of the disclosure can be applied in a metal-ion battery.

According to embodiments of the disclosure, the disclosure also provides a metal-ion battery. FIG. 1 is a schematic view of the metal-ion battery 100 according to an embodiment of the disclosure. The metal-ion battery 100 can include a positive electrode 10, a negative electrode 12, and a separator 14, wherein the separator 14 can be disposed between the positive electrode 10 and the negative electrode 12 to separate the negative electrode 12 and the positive electrode 10 from each other, preventing the positive electrode 10 from coming into direct contact with the negative electrode 12. The metal-ion battery 100 further includes the aforementioned electrolyte composition 20 disposed between the positive electrode and the negative electrode in the battery. Thus, the electrolyte composition 20 comes into contact with the positive electrode 10 and the negative electrode 12. The metal-ion battery can be a rechargeable secondary battery or it can be a primary battery.

According to embodiments of the disclosure, the positive electrode 10 can contain a current collector 11 and an active material 13 which is disposed on the current collector. According to embodiments of the disclosure, the positive electrode 10 can consist of the current collector 11 and the active material 13. According to embodiments of the disclosure, the current collector 11 can be conductive carbon substrate, such as carbon cloth, carbon felt, or carbon paper. The current collector 11 can be a metal material, for example a metal such as aluminum, nickel, copper, etc. In addition, the current collector 11 can be a composite of a carbon material and a metal. For example, the carbon content of the conductive carbon substrate is greater than 65 wt % and the conductive carbon substrate has a sheet resistance from about 1 mΩ·cm-2 to 6 mΩ·cm-2. The active material 13 can be layered carbon material, vanadium oxide, metal sulfide, or a combination thereof. According to embodiments of the disclosure, the layered carbon material is graphite, carbon nanotube, graphene, or a combination thereof.

According to embodiments of the disclosure, the layered carbon material can be intercalated carbon material, such as graphite (including natural graphite, electrographite, pyrolytic graphite, foamed graphite, flake graphite or expanded graphite), graphene, carbon nanotube, or a combination thereof. The active material 13 can have the porosity in a range from about 0.05 to 0.95, such as from about 0.3 and 0.9. In addition, according to embodiments of the disclosure, the active material 13 can develop directly above the current collector 11 (i.e. there is no other layer between the active layer and the current-collecting layer). Furthermore, the active material 13 can be affixed to the current-collecting layer 11 via an adhesive.

According to embodiments of the disclosure, the separator 14 can be glass fibers, polyethylene (PE), polypropylene (PP), nonwoven fabric, wood fibers, poly(ether sulfones) (PES), ceramic fibers, or a combination thereof.

According to embodiments of the disclosure, the negative electrode 12 can be a metal or an alloy of the metal. According to the embodiments of the disclosure, the metal can be aluminum, copper, iron, zinc, indium, nickel, tin, chromium, yttrium, titanium, or molybdenum. In addition, the negative electrode 12 can further contain a current collector (not shown), and the metal or the alloy of the metal is disposed on the current collector. According to embodiments of the disclosure, the metal or the alloy of the metal can be disposed directly on the current collector (i.e. there is no other layer between the active layer and the current-collecting layer). Furthermore, the active material 13 can be affixed to the current-collecting layer 11 via an adhesive. According to embodiments of the disclosure, the metal can have a reduction potential lower than that of aluminum, thereby solving the problem of the negative electrode corrosion of the metal-ion battery.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Preparation of Electrolyte Composition

Comparative Example 1

Figure 2:
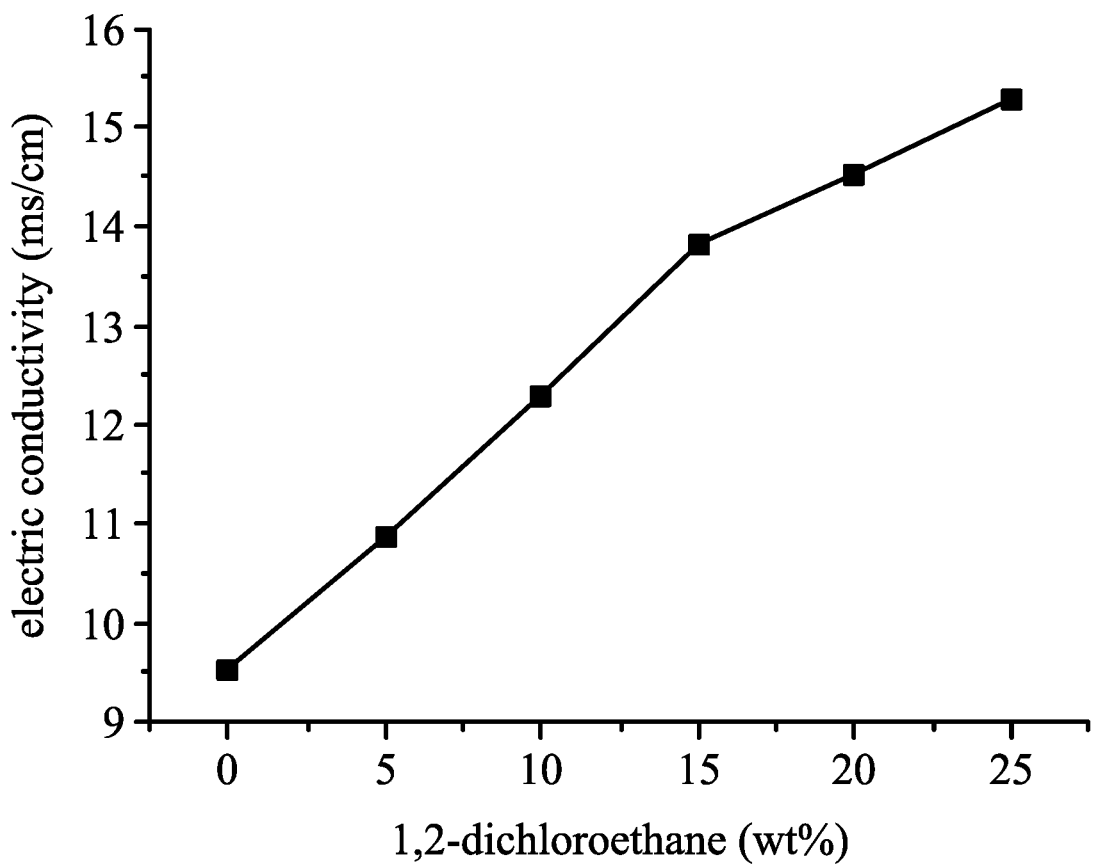
FIG. 2 is a graph plotting the relationship between the amount of 1,2-dichloroethene and the conductivity of electrolyte compositions as disclosed in Examples 1-5 and Comparative Example 1.

Aluminum chloride and 1-butyl-3-methylimidazolium chloride were mixed. After stirring for 12 hr, Electrolyte composition (1) was obtained, wherein the molar ratio of aluminum chloride to 1-butyl-3-methylimidazolium chloride is 1.5:1. The conductivity of Electrolyte composition (1) was measured, and the result is shown in FIG. 2 and Table 1.

Example 1

5 parts by weight of 1,2-dichloroethene and 100 parts by weight of electrolyte composition (1) were mixed. After stirring for 12 hr, Electrolyte composition (2) was obtained. The conductivity of Electrolyte composition (2) was measured, and the result is shown in FIG. 2 and Table 1.

Example 2

Example 2 was performed in the same manner as the preparation of Electrolyte composition (2) as disclosed in Example 1, except that the amount of 1,2-dichloroethene was increased from 5 parts by weight to 10 parts by weight. Electrolyte composition (3) was obtained. The conductivity of Electrolyte composition (3) was measured, and the result is shown in FIG. 2 and Table 1.

Example 3

Example 3 was performed in the same manner as the preparation of Electrolyte composition (2) as disclosed in Example 1, except that the amount of 1,2-dichloroethene was increased from 5 parts by weight to 15 parts by weight. Electrolyte composition (4) was obtained. The conductivity of Electrolyte composition (4) was measured, and the result is shown in FIG. 2 and Table 1.

Example 4

Example 4 was performed in the same manner as the preparation of Electrolyte composition (2) as disclosed in Example 1, except that the amount of 1,2-dichloroethene was increased from 5 parts by weight to 20 parts by weight. Electrolyte composition (5) was obtained. The conductivity of Electrolyte composition (5) was measured, and the result is shown in FIG. 2 and Table 1.

Example 5

Example 5 was performed in the same manner as the preparation of Electrolyte composition (2) as disclosed in Example 1, except that the amount of 1,2-dichloroethene was increased from 5 parts by weight to 25 parts by weight. Electrolyte composition (6) was obtained. The conductivity of Electrolyte composition (6) was measured, and the result is shown in FIG. 2 and Table 1.

TABLE 1

| | metal halide/solvent (molar ratio) | 1,2-dichloroethene (parts by weight) | conductivity (ms/cm) |
|---|---|---|---|
| Electrolyte composition (1) | aluminum chloride:1-butyl-3-methylimidazolium chloride = 1.5:1 | 0 | 9.53 |
| electrolyte composition (2) | | 5 | 10.87 |
| electrolyte composition (3) | | 10 | 12.3 |
| electrolyte composition (4) | | 15 | 13.85 |
| electrolyte composition (5) | | 20 | 14.32 |
| electrolyte composition (6) | | 25 | 15.32 |

As shown in Table 1, Electrolyte composition (1) (in the absence of 1,2-dichloroethene) had a conductivity of 9.53 ms/cm. The conductivity of the electrolyte compositions was increased in accordance with the increase of the concentration of 1,2-dichloroethene. When 1,2-dichloroethene has a concentration of 25 wt % (25 parts by weight of 1,2-dichloroethene mixed with 100 parts by weight of Electrolyte composition (1)), Electrolyte composition (6) had a conductivity of 15.32 ms/cm.

Comparative Example 2

Figure 3:
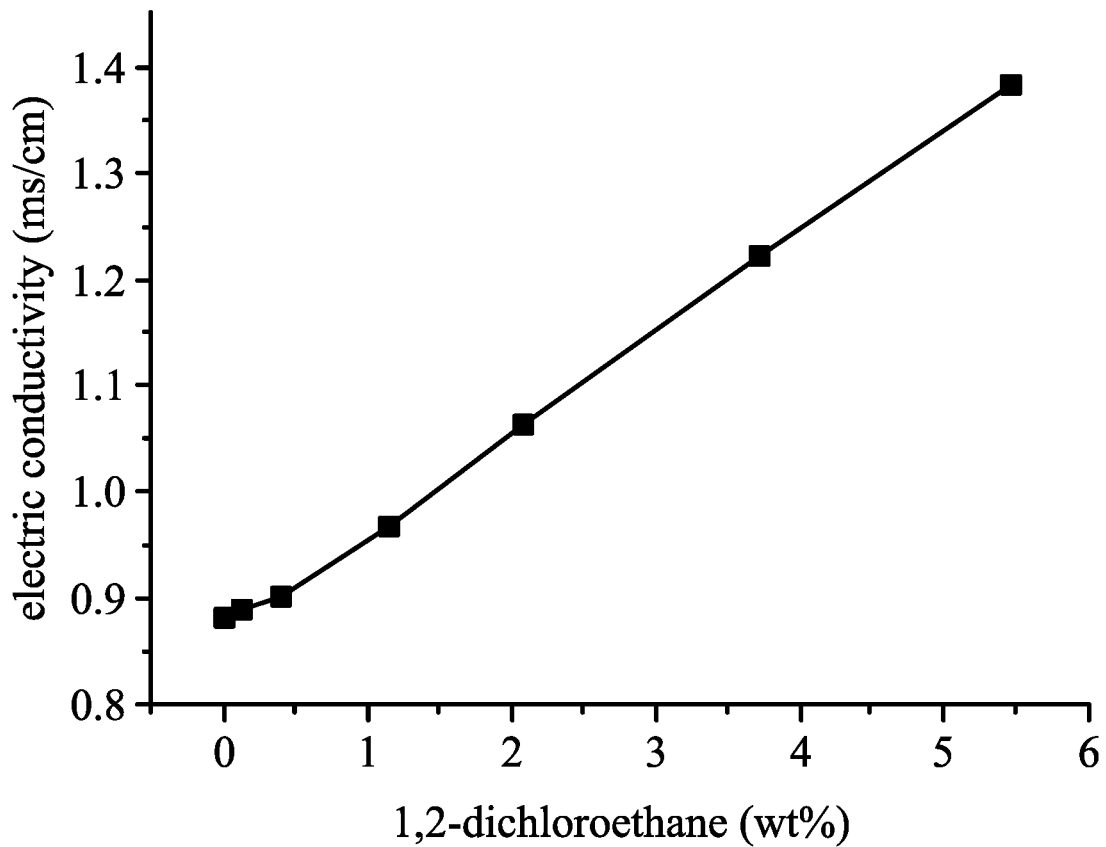
FIG. 3 is a graph plotting the relationship between the amount of 1,2-dichloroethene and the conductivity of electrolyte compositions as disclosed in Examples 6-11 and Comparative Example 2.

Aluminum chloride and urea were mixed. After stirring for 12 hr, Electrolyte composition (7), wherein the molar ratio of aluminum chloride to urea is 1.6:1. The conductivity of Electrolyte composition (7) was measured, and the result is shown in FIG. 3 and Table 2.

Example 6

0.115 parts by weight of 1,2-dichloroethene and 100 parts by weight of Electrolyte composition (7) were mixed. After stirring for 12 hr, Electrolyte composition (8) was obtained. The conductivity of Electrolyte composition (8) was measured, and the result is shown in FIG. 3 and Table 2.

Example 7

Example 7 was performed in the same manner as the preparation of Electrolyte composition (8) as disclosed in Example 6, except that the amount of 1,2-dichloroethene was increased from 0.115 parts by weight to 0.383 parts by weight. Electrolyte composition (9) was obtained. The conductivity of Electrolyte composition (9) was measured, and the result is shown in FIG. 3 and Table 2.

Example 8

Example 8 was performed in the same manner as the preparation of Electrolyte composition (8) as disclosed in Example 6, except that the amount of 1,2-dichloroethene was increased from 0.115 parts by weight to 1.141 parts by weight. Electrolyte composition (10) was obtained. The conductivity of Electrolyte composition (10) was measured, and the result is shown in FIG. 3 and Table 2.

Example 9

Example 9 was performed in the same manner as the preparation of Electrolyte composition (8) as disclosed in Example 6, except that the amount of 1,2-dichloroethene was increased from 0.115 parts by weight to 2.072 parts by weight. Electrolyte composition (11) was obtained. The conductivity of Electrolyte composition (11) was measured, and the result is shown in FIG. 3 and Table 2.

Example 10

Example 10 was performed in the same manner as the preparation of Electrolyte composition (8) as disclosed in Example 6, except that the amount of 1,2-dichloroethene was increased from 0.115 parts by weight to 3.704 parts by weight. Electrolyte composition (12) was obtained. The conductivity of Electrolyte composition (12) was measured, and the result is shown in FIG. 3 and Table 2.

Example 11

Example 11 was performed in the same manner as the preparation of Electrolyte composition (8) as disclosed in Example 6, except that the amount of 1,2-dichloroethene was increased from 0.115 parts by weight to 5.455 parts by weight. Electrolyte composition (13) was obtained. The conductivity of Electrolyte composition (13) was measured, and the result is shown in FIG. 3 and Table 2.

TABLE 2

|  | metal halide/solvent (molar ratio) | 1,2-dichloroethene (wt %) | conductivity (ms/cm) |
|---|---|---|---|
| Electrolyte composition (7) | aluminum chloride:urea = 1.6:1 | 0 | 0.883 |
| Electrolyte composition (8) |  | 0.115 | 0.890 |
| Electrolyte composition (9) |  | 0.383 | 0.902 |
| Electrolyte composition (10) |  | 1.141 | 0.971 |
| Electrolyte composition (11) |  | 2.072 | 1.066 |
| Electrolyte composition (12) |  | 3.704 | 1.225 |
| Electrolyte composition (13) |  | 5.455 | 1.385 |

As shown in Table 2, Electrolyte composition (7) (in the absence of 1,2-dichloroethene) had a conductivity of 0.883 ms/cm. The conductivity of the electrolyte compositions was increased in accordance with the increase of the concentration of 1,2-dichloroethene. When 1,2-dichloroethene has a concentration of 5.455 wt % (5.455 parts by weight of 1,2-dichloroethene mixed with 100 parts by weight of Electrolyte composition (7)), Electrolyte composition (13) had a conductivity of 1.385 ms/cm. As a result, due to the addition of 1,2-dichloroethene, the electrolyte composition (including aluminum chloride and urea) can be improved. As shown in Table 2, the conductivity of Electrolyte composition (13) (in the presence of 1,2-dichloroethene) is about 1.57 times higher than that of Electrolyte composition (7) (in the absence of 1,2-dichloroethene).

Comparative Example 3

Aluminum chloride and 1-butyl-3-methylimidazolium chloride) were mixed. After stirring for 12 hr, Electrolyte composition (14) was obtained, wherein the molar ratio of aluminum chloride to 1-butyl-3-methylimidazolium chloride is 1.6:1.

Example 12

3 parts by weight of methyl pyidine and 100 parts by weight of Electrolyte composition (14) were mixed. After stirring for 12 hr, Electrolyte composition (15).

Example 13

3 parts by weight of methyl nicotinate and 100 parts by weight of Electrolyte composition (14) were mixed. After stirring for 12 hr, Electrolyte composition (16) was obtained.

Metal-Ion Battery

Comparative Example 4

An aluminum foil (with a thickness of 0.05 mm, manufactured by Alfa Aesar) was cut to obtain an aluminum electrode. Next, the aluminum electrode (serving as negative electrode), a separator (glass filter paper with 2 layers, sold by Whatman with trade No. 934-AH), and a graphite electrode (including an active material disposed on a current-collecting substrate, wherein the current-collecting substrate was carbon fiber paper and the active material was natural graphite (302.82 mg)) (serving as positive electrode) were placed in sequence and sealed within an aluminum plastic pouch. Electrolyte composition (14) (including aluminum chloride ($AlCl_3$) and 1-ethyl-3-methylimidazolium chloride ([EMIm]Cl), wherein the molar ratio of $AlCl_3$ to [EMIm]Cl is about 1.6:1) was injected into the aluminum plastic pouch in an argon-filled glovebox, obtaining Metal-ion battery (1). Next, Metal-ion battery (1) was charged (to about 2.45V with a current of 500 $mAg^{-1}$) and discharged (to about 1.0V with a current of 500 $mAg^{-1}$) by a NEWARE battery analyzer to determine the discharging specific capacity and lifespan, and the results are shown in Table 3.

Example 14

An aluminum foil (with a thickness of 0.05 mm, manufactured by Alfa Aesar) was cut to obtain an aluminum electrode. Next, the aluminum electrode (serving as negative electrode), a separator (glass filter paper with 2 layers, sold by Whatman with trade No. 934-AH), and a graphite electrode (including an active material disposed on a current-collecting substrate, wherein the current-collecting substrate was carbon fiber paper and the active material was natural graphite (346 mg)) (serving as positive electrode) were placed in sequence and sealed within an aluminum plastic pouch. Electrolyte composition (15) was injected into the aluminum plastic pouch in an argon-filled glovebox, obtaining Metal-ion battery (2). Next, Metal-ion battery (2) was charged (to about 2.45V with a current of 500 $mAg^{-1}$) and discharged (to about 1.0V with a current of 500 $mAg^{-1}$) by a NEWARE battery analyzer to determine the discharging specific capacity and lifespan, and the results are shown in Table 3.

Example 15

An aluminum foil (with a thickness of 0.05 mm, manufactured by Alfa Aesar) was cut to obtain an aluminum electrode. Next, the aluminum electrode (serving as negative electrode), a separator (glass filter paper with 2 layers, sold by Whatman with trade No. 934-AH), and a graphite electrode (including an active material disposed on a current-collecting substrate, wherein the current-collecting substrate was carbon fiber paper and the active material was natural graphite (349 mg)) (serving as positive electrode) were placed in sequence and sealed within an aluminum plastic pouch. Electrolyte composition (16) was injected into the aluminum plastic pouch in an argon-filled glovebox, obtaining Metal-ion battery (3). Next, Metal-ion battery (3) was charged (to about 2.45V with a current of 500 $mAg^{-1}$) and discharged (to about 1.0V with a current of 500 $mAg^{-1}$) by a NEWARE battery analyzer to determine the discharging specific capacity and lifespan, and the results are shown in Table 3.

TABLE 3

|  | discharging specific capacity (mAh/g) | lifespan (cycles) (which the metal-ion battery has a specific capacity more than 80% of initial specific capacity) |
|---|---|---|
| metal-ion battery (1) | 39 | 180 |
| metal-ion battery (2) | 44 | 390 |
| metal-ion battery (3) | 9.5 | 1000 |

As shown in Table 3, Metal-ion battery (1) (in the absence of the additive) had a specific capacity of 39 (mAh/g) and a lifespan (which the metal-ion battery has a specific capacity more than 80% of initial specific capacity) of 180 charging-discharging cycles. The discharging specific capacity of Metal-ion battery (2) (in the presence of methyl pyidine) was approximately 1.128 times the discharging specific capacity of Metal-ion battery (1), and the lifespan of Metal-ion battery (2) (in the presence of methyl pyidine) was approximately 2.16 times the lifespan of Metal-ion battery (1). In addition, although the discharging specific capacity of Metal-ion battery (3) (in the presence of methyl nicotinate) is lower than that of Metal-ion battery (1), the lifespan of Metal-ion battery (3) (in the presence of methyl pyidine) was approximately 5.55 times the lifespan of Metal-ion battery (1).

It will be clear that various modifications and variations can be made to the disclosed methods and materials. It is intended that the specification and examples be considered as exemplary only, with the true scope of the disclosure being indicated by the following claims and their equivalents.

What is claimed is:

1. An electrolyte composition, comprising:
    a metal halide;
    a solvent, wherein the solvent is a halogen-containing ionic liquid or an organic solvent, and the molar ratio of the metal halide to the solvent is from 1:1 to 2.2:1; and
    an additive, wherein the amount of additive is from 0.1 wt % to 25 wt %, based on the total weight of the metal halide and the solvent, and wherein the additive is monochloroethane, trichlorethylene, trichloroethane, phosphorus trichloride, phosphorus pentachloride, methyl pyridine, methyl nicotinate, or a combination thereof.

2. The electrolyte composition as claimed in claim 1, wherein the metal halide is aluminum chloride, ferric chloride, zinc chloride, cupric chloride, manganese chloride, chromium chloride, or a combination thereof.

3. The electrolyte composition as claimed in claim 1, wherein the halogen-containing ionic liquid comprises ammonium chloride, azaannulenium chloride, azathiazolium chloride, benzimidazolium chloride, benzofuranium chloride, benzotriazolium chloride, borolium chloride, cholinium chloride, cinnolinium chloride, diazabicyclodecenium chloride, diazabicyclononenium chloride, diazabicyclo-undecenium chloride, dithiazolium chloride, furanium chloride, guanidinium chloride, imidazolium chloride, indazolium chloride, indolinium chloride, indolium chloride, morpholinium chloride, oxaborolium chloride, oxaphospholium chloride, oxazinium chloride, oxazolium chloride, iso-oxazolium chloride, oxathiazolium chloride, pentazolium chloride, phospholium chloride, phosphonium chloride, phthalazinium chloride, piperazinium chloride, piperidinium chloride, pyranium chloride, pyrazinium chloride, pyrazolium chloride, pyridazinium chloride, pyridinium chloride, pyrimidinium chloride, pyrrolidinium chloride, pyrrolium chloride, quinazolinium chloride, quinolinium chloride, iso-quinolinium chloride, quinoxalinium chloride, selenozolium chloride, sulfonium chloride, tetrazolium chloride, iso-thiadiazolium chloride, thiazinium chloride, thiazolium chloride, thiophenium chloride, thiuronium chloride, triazadecenium chloride, triazinium chloride, triazolium chloride, iso-triazolium chloride or uronium chloride.

4. The electrolyte composition as claimed in claim 1, wherein the organic solvent is urea, N-methylurea, dimethyl sulfoxide, methylsulfonylmethane or a combination thereof.

5. The electrolyte composition as claimed in claim 1, wherein the halogen-containing ionic liquid comprises methylimidazolium chloride, 1-ethyl-3-methylimidazolium chloride, 1-butyl-3-methylimidazolium chloride, cholinium chloride, or a combination thereof.

6. A metal-ion battery, comprising:
    a positive electrode;
    a separator;
    a negative electrode, wherein the negative electrode and the positive electrode are separated from each other by the separator; and
    the electrolyte composition of claim 1 disposed between the positive electrode and the negative electrode.

7. The metal-ion battery as claimed in claim 6, wherein the positive electrode consists of a current collector and an active material.

8. The metal-ion battery as claimed in claim 7, wherein the current-collecting layer is conductive carbon substrate.

9. The metal-ion battery as claimed in claim 8, wherein the conductive carbon substrate is carbon cloth, carbon felt or carbon paper.

10. The metal-ion battery as claimed in claim 7, wherein the active material is layered carbon material, vanadium oxide or metal sulfide.

11. The metal-ion battery as claimed in claim 10, wherein the layered carbon material is graphite, carbon nanotube, graphene or a combination thereof.

12. The metal-ion battery as claimed in claim 11, wherein the graphite is natural graphite, electrographite, pyrolytic graphite, foamed graphite, flake graphite, expanded graphite or a combination thereof.

13. The metal-ion battery as claimed in claim 6, wherein the negative electrode comprises a metal or an alloy of the metal, a current collector, or a combination thereof.

14. The metal-ion battery as claimed in claim 13, wherein the metal or the alloy of the metal comprises copper, iron, aluminum, zinc, indium, nickel, tin, chromium, yttrium, titanium, manganese, or molybdenum.

15. The metal-ion battery as claimed in claim 6, wherein separator is glass fibers, polyethylene, polypropylene, non-woven fabric, wood fibers, poly(ether sulfones), ceramic fibers, or a combination thereof.

* * * * *